(12) United States Patent
Prasad et al.

(10) Patent No.: US 11,683,666 B2
(45) Date of Patent: Jun. 20, 2023

(54) DATA TRANSMISSION

(71) Applicant: Nokia Technologies Oy, Espoo (FI)

(72) Inventors: Athul Prasad, Helsinki (FI); Dani Korpi, Helsinki (FI); Rafhael Amorim, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 14 days.

(21) Appl. No.: 16/892,189

(22) Filed: Jun. 3, 2020

(65) Prior Publication Data

US 2020/0404460 A1 Dec. 24, 2020

(30) Foreign Application Priority Data

Jun. 18, 2019 (FI) ...................................... 20195531

(51) Int. Cl.
| | |
|---|---|
| *H04W 4/08* | (2009.01) |
| *H04W 4/029* | (2018.01) |
| *H04W 24/08* | (2009.01) |
| *H04W 40/18* | (2009.01) |
| *H04W 40/20* | (2009.01) |

(52) U.S. Cl.
CPC ............ *H04W 4/08* (2013.01); *H04W 4/029* (2018.02); *H04W 24/08* (2013.01); *H04W 40/18* (2013.01); *H04W 40/20* (2013.01)

(58) Field of Classification Search
CPC ....... H04W 84/12; H04W 4/50; H04W 24/08; H04W 28/16; H04W 40/18; H04W 40/20; H04W 4/029; H04W 4/08; H04W 64/00; H04W 72/005; H04W 72/0413
USPC ....... 455/67.11, 456.2, 440, 522, 456.1, 434, 455/466, 450; 370/310, 331, 235, 252, 370/337, 338, 329, 238, 312, 242, 254, 370/230.1, 259, 389
See application file for complete search history.

(56) References Cited

U.S. PATENT DOCUMENTS

| | | | |
|---|---|---|---|
| 9,232,246 B2 | 1/2016 | Kotecha et al. | |
| 9,648,113 B2 | 5/2017 | Khivesara et al. | |
| (Continued) | | | |

FOREIGN PATENT DOCUMENTS

| | | |
|---|---|---|
| EP | 3376739 A2 | 9/2018 |
| GB | 2499747 A | 8/2013 |
| (Continued) | | |

OTHER PUBLICATIONS

Partial European Search Report received for corresponding European Patent Application No. 20180746.8, dated Oct. 14, 2020, 15 pages.

(Continued)

*Primary Examiner* — Joseph Arevalo
(74) *Attorney, Agent, or Firm* — Ditthavong, Steiner, & Mlotkowski

(57) ABSTRACT

An apparatus, method and computer program product for: receiving information relating to data consumption characteristics of at least one user device, predicting, based on the received information, at least one data consumption area at a first point in time, determining one or more data transmission modes based on the received information and the predicted at least one data consumption area and instructing at least one communication network element to provide data transmission at the first point in time according to the determined data transmission mode.

17 Claims, 4 Drawing Sheets

(56) References Cited

U.S. PATENT DOCUMENTS

| | | | |
|---|---|---|---|
| 9,936,241 B2 | 4/2018 | Basra | |
| 10,114,050 B2* | 10/2018 | Matthews | G01R 21/133 |
| 10,650,621 B1* | 5/2020 | King | H04L 67/10 |
| 11,108,630 B2* | 8/2021 | Woodland | H04L 45/74 |
| 2003/0229900 A1* | 12/2003 | Reisman | H04N 21/4755 |
| | | | 348/E7.071 |
| 2011/0078310 A1 | 3/2011 | Slssingar et al. | |
| 2012/0151174 A1* | 6/2012 | Matsunaga | G06F 3/0689 |
| | | | 711/171 |
| 2012/0208512 A1 | 8/2012 | Maharajh et al. | |
| 2012/0289147 A1* | 11/2012 | Raleigh | H04N 21/6547 |
| | | | 455/3.06 |
| 2013/0052940 A1 | 2/2013 | Brillhart et al. | |
| 2013/0111520 A1 | 5/2013 | Lo et al. | |
| 2013/0238751 A1* | 9/2013 | Raleigh | H04L 67/26 |
| | | | 709/217 |
| 2013/0238761 A1* | 9/2013 | Raleigh | H04L 67/2847 |
| | | | 709/219 |
| 2013/0238777 A1* | 9/2013 | Raleigh | H04L 67/1097 |
| | | | 709/223 |
| 2013/0295963 A1 | 11/2013 | Sen | |
| 2013/0311539 A1* | 11/2013 | Ngai | G06F 9/5072 |
| | | | 709/201 |
| 2013/0311669 A1 | 11/2013 | Reimers et al. | |
| 2013/0329673 A1* | 12/2013 | Kwon | H04W 72/0406 |
| | | | 370/329 |
| 2013/0343231 A1* | 12/2013 | Foti | H04L 41/069 |
| | | | 370/259 |
| 2014/0038647 A1* | 2/2014 | Zhang | H04W 68/005 |
| | | | 455/458 |
| 2014/0062790 A1* | 3/2014 | Letz | H04L 51/20 |
| | | | 342/386 |
| 2014/0099978 A1 | 4/2014 | Egner et al. | |
| 2014/0150016 A1* | 5/2014 | Feng | H04L 51/32 |
| | | | 725/34 |
| 2015/0288997 A1 | 10/2015 | Basra | |
| 2016/0080446 A1 | 3/2016 | Karthikeyan et al. | |
| 2016/0182359 A1* | 6/2016 | Otomo | H04L 45/28 |
| | | | 370/216 |
| 2017/0094359 A1 | 3/2017 | Basra | |
| 2017/0278061 A1* | 9/2017 | Skaaksrud | H04W 4/80 |
| 2017/0357305 A1* | 12/2017 | Kunnathur Ragupathi | |
| | | | G06F 1/3206 |
| 2018/0114249 A1* | 4/2018 | Malkin | G06Q 30/0261 |
| 2018/0157729 A1* | 6/2018 | Lee | H04L 67/1029 |
| 2018/0199115 A1 | 7/2018 | Prasad | |
| 2018/0232534 A1* | 8/2018 | Dotan-Cohen | H04W 12/033 |
| 2018/0299846 A1* | 10/2018 | Ray | H04L 67/125 |
| 2018/0300788 A1* | 10/2018 | Mattingly | G06Q 30/0625 |
| 2019/0045489 A1* | 2/2019 | He | H04W 72/12 |
| 2019/0116340 A1 | 4/2019 | Segel | |
| 2019/0132708 A1 | 5/2019 | Belghoul et al. | |
| 2019/0138553 A1 | 5/2019 | Maharajh et al. | |
| 2020/0094091 A1* | 3/2020 | Skaaksrud | G08B 25/009 |
| 2020/0333767 A1* | 10/2020 | Engelstein | H04Q 9/00 |
| 2021/0067814 A1* | 3/2021 | Bogatin | H04N 7/122 |

FOREIGN PATENT DOCUMENTS

| | | |
|---|---|---|
| WO | 2012/100144 A2 | 7/2012 |
| WO | 2013/063483 A2 | 5/2013 |
| WO | 2015/070454 A1 | 5/2015 |
| WO | 2017/083210 A1 | 5/2017 |
| WO | 2019/161927 A1 | 8/2019 |

OTHER PUBLICATIONS

"Emmys: Why Live Programming Is Dominating This Year", The Hollywood Reporter, Retrieved on Jun. 8, 2020, Webpage available at: https://www.hollywoodreporter.com/race/emmys-why-live-programming-is-dominating-year-1027253.

"Deliverable D4.1 Mobile Core Network", 5G-Xcast, Version v1.0., May 31, 2018, 76 pages.

Yang et al., "Protocol Design for Scalable and Adaptive Multicast for Group Communications", IEEE International Conference on Network Protocols, Oct. 19-22, 2008, pp. 33-42.

Bao et al., "Motion-Prediction-Based Multicast for 360-Degree Video Transmissions", 14th Annual IEEE International Conference on Sensing, Communication, and Networking (SECON), Jun. 12-14, 2017, 9 pages.

U.S. Appl. No. 16/722,095, "Differentiated Scheduling of Xcast Traffic", filed Dec. 20, 2019, pp. 1-46.

Office action received for corresponding Finnish Patent Application No. 20195,531, dated Jan. 7, 2020, 8 pages.

Lim et al., "Characterizing and predicting mobile application usage", Computer Communications, Elsevier, vol. 95, Dec. 1, 2016, pp. 82-94.

Extended European Search Report received for corresponding European Patent Application No. 20180746.8, dated Jan. 18, 2021, 16 pages.

Office Action for related European Patent Application No. 20 180 746.8-1215, dated Jan. 2, 2023, 7 pages.

* cited by examiner

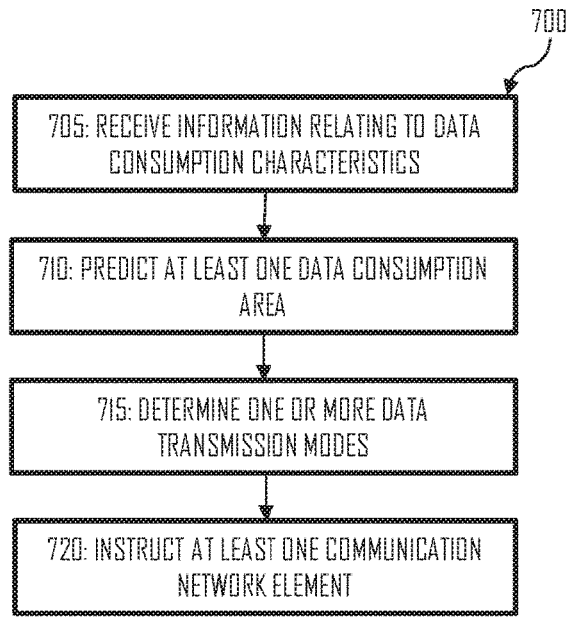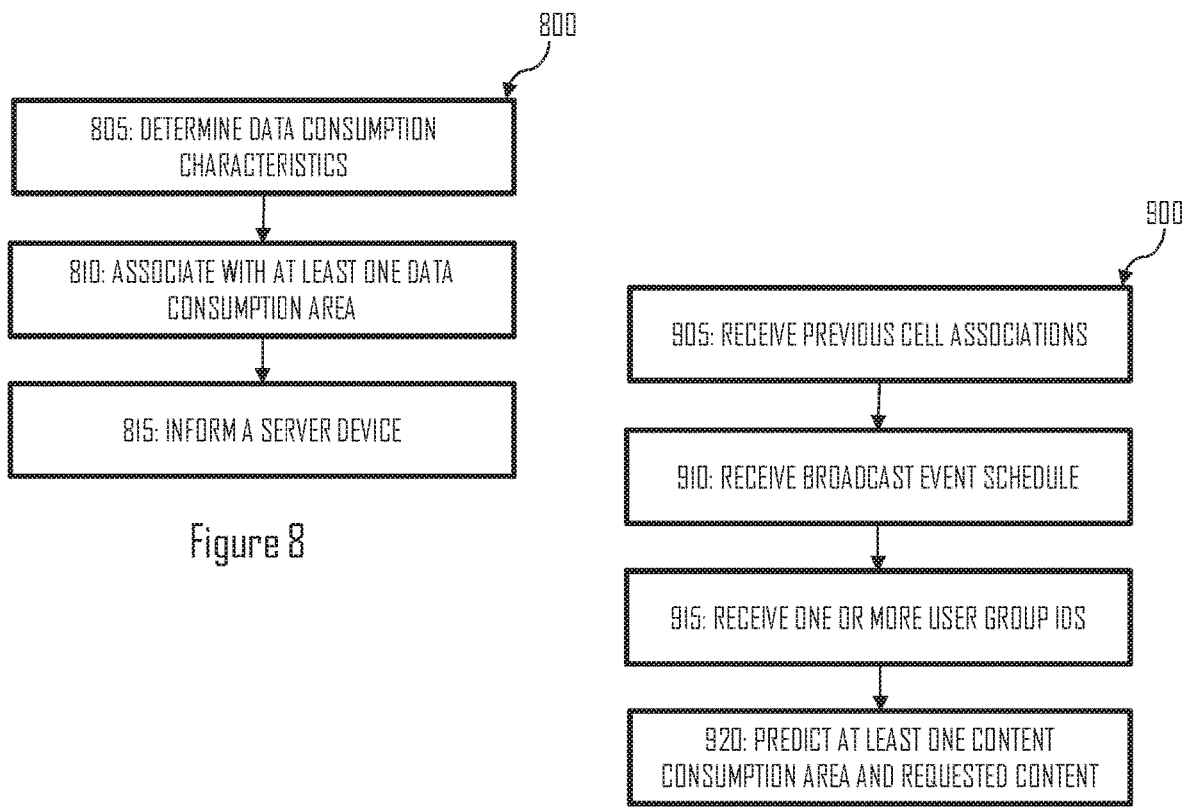

DATA TRANSMISSION

TECHNICAL FIELD

The present application relates generally to predicting at least one data consumption area. More specifically, the present application relates to predicting at least one data consumption are and determining one or more data transmission modes.

BACKGROUND

The amount of content delivered over the Internet has been increased remarkably over the past years. Video content forms a big part of total traffic served on the Internet.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: receiving information relating to data consumption characteristics of at least one user device, predicting, based on the received information, at least one data consumption area at a first point in time, determining one or more data transmission modes based on the received information and the predicted at least one data consumption area and instructing at least one communication network element to provide data transmission at the first point in time according to the determined data transmission mode.

According to a second aspect of the invention, there is provided a method comprising: receiving information relating to data consumption characteristics of at least one user device, predicting, based on the received information, at least one data consumption area at a first point in time, determining one or more data transmission modes based on the received information and the predicted at least one data consumption area and instructing at least one communication network element to provide data transmission at the first point in time according to the determined data transmission mode.

According to a third aspect of the invention, there is provided a computer program comprising instructions for causing an apparatus to perform at least the following: receiving information relating to data consumption characteristics of at least one user device, predicting, based on the received information, at least one data consumption area at a first point in time, determining one or more data transmission modes based on the received information and the predicted at least one data consumption area and instructing at least one communication network element to provide data transmission at the first point in time according to the determined data transmission mode.

According to a fourth aspect of the invention, there is provided an apparatus comprising at least one processor and at least one memory including computer program code, the at least one memory and the computer program code configured to with the at least one processor, cause the apparatus at least to: receive information relating to data consumption characteristics of at least one user device, predict, based on the received information, at least one data consumption area at a first point in time, determine one or more data transmission modes based on the received information and the predicted at least one data consumption area, and instruct at least one communication network element to provide data transmission at the first point in time according to the determined data transmission mode.

According to a fifth aspect of the invention, there is provided a non-transitory computer readable medium comprising program instructions for causing an apparatus to perform at least the following: receiving information relating to data consumption characteristics of at least one user device, predicting, based on the received information, at least one data consumption area at a first point in time, determining one or more data transmission modes based on the received information and the predicted at least one data consumption area and instructing at least one communication network element to provide data transmission at the first point in time according to the determined data transmission mode.

According to a sixth aspect of the invention, there is provided a computer readable medium comprising program instructions for causing an apparatus to perform at least the following: receiving information relating to data consumption characteristics of at least one user device, predicting, based on the received information, at least one data consumption area at a first point in time, determining one or more data transmission modes based on the received information and the predicted at least one data consumption area and instructing at least one communication network element to provide data transmission at the first point in time according to the determined data transmission mode.

BRIEF DESCRIPTION OF THE DRAWINGS

For a more complete understanding of example embodiments of the present invention, reference is now made to the following descriptions taken in connection with the accompanying drawings in which:

FIG. 7 illustrates another example method according to an example embodiment of the invention;

FIG. 8 illustrates a further example method according to an example embodiment of the invention;

FIG. 9 illustrates a yet further example method according to an example embodiment of the invention.

DETAILED DESCRIPTION OF THE DRAWINGS

Figure 1:
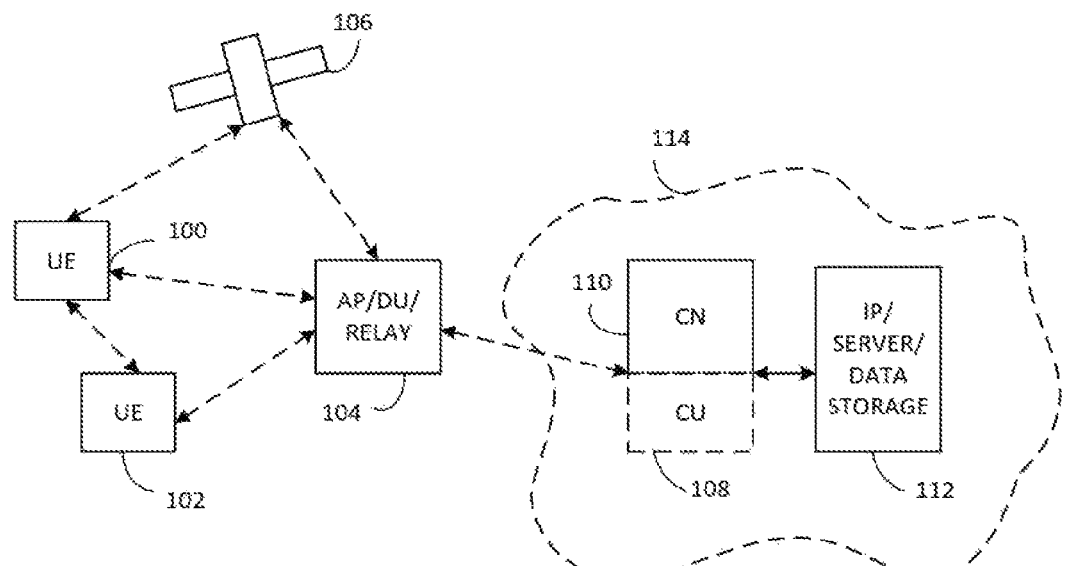
FIG. 1 shows a part of an exemplifying radio access network in which examples of disclosed embodiments may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to instructing at least one communication network element to provide data transmission. More particularly, example embodiments relate to instructing at least one communication network element to provide data transmission according to a determined data transmission mode.

Example embodiments relate to an apparatus at a network side and an apparatus at a client side. The apparatus at a network side may be comprised by a server device and the apparatus at a client side may be comprised by a user device.

According to an example embodiment, an apparatus at a network side is configured to receive information relating to data consumption characteristics of at least one user device and predict, based on the received information, at least one data consumption area at a first point in time. The apparatus is further configured to determine one or more transmission modes based on the received information and predicted art least one data consumption area. The apparatus is yet further configured to instruct at least one communication network element to provide data transmission at the first point in time according to the determined data transmission mode.

According to an example embodiment, an apparatus at a client side is configured to determine data consumption characteristics of a user apparatus and associate the apparatus with at least one user group based on the data consumption characteristics. The apparatus is further configured to inform a server device about the at least one user group with which the apparatus is associated.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system may comprise more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The (e/g) NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device refers, for example, to a wireless mobile communication device operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, navigation device, vehicle infotainment system, and multimedia device, or any combination thereof. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of content delivery use cases and related applications including, for example, video streaming, audio streaming, augmented reality, gaming, map data, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which may be installed within an operator's network may aggregate traffic from a large number of HNBs back to a core network.

As commonly known in connection with wireless communication systems, control or management information is transferred over a radio interface, e.g. between the terminal device 100 and the access node 104.

Multimedia consumption has increased significantly during the past years and it is expected to grow also in the future with the advent of live streaming capabilities in popular social media websites and/or applications. Content delivery may be enabled through mobile network of fixed network or a combination thereof.

Broadcast transmission may be used to offload a portion of traffic peak when users are consuming common content, for example, during major sporting events or concerts. Broadcast transmission enables delivering content to a large number of user equipment (UE) without the need to deliver the same content to each user individually. Broadcast transmission comprises providing data from a single source to all receivers within a defined geographical area. The defined geographical area may comprise, for example, a cell corresponding to a base station. Therefore, broadcast transmission may be referred to as one-to-all transmission.

Content may also be delivered to a UE using unicast transmission, multicast transmission or anycast transmission. Unicast transmission comprises providing data from a single source to a specified receiver and may, therefore, be referred as one-to-one transmission.

Multicast transmission comprises providing data from a single source to a plurality of defined receivers. The plurality of defined receivers may comprise, for example, members of a particular multicast group. Therefore, multicast transmission may be referred to as one-to-many transmission.

Anycast transmission comprises providing data from a single source to a nearest receiver. Therefore, multicast may be referred to as one-to-nearest transmission.

A system capable of exploiting a mix of unicast and multicast/broadcast may be referred to as Xcast.

Previously, unicast transmission has been a popular way to deliver content due to static or semi-static delivery mechanisms, complexity caused by signalling and availability of a plurality of different kinds of network. However, unicast transmission is not radio resource efficient, especially if the amount of traffic is large due to, for example, major sporting events or concerts.

Broadcast and multicast are considered as important delivery mechanisms not only for multimedia distribution, but also when considering future use cases such as connected cars and internet of things (IoT). Therefore, as massive amount of data needs to be handled, there is a need to optimize content delivery in terms of delivering content to end users efficiently.

Figure 2:
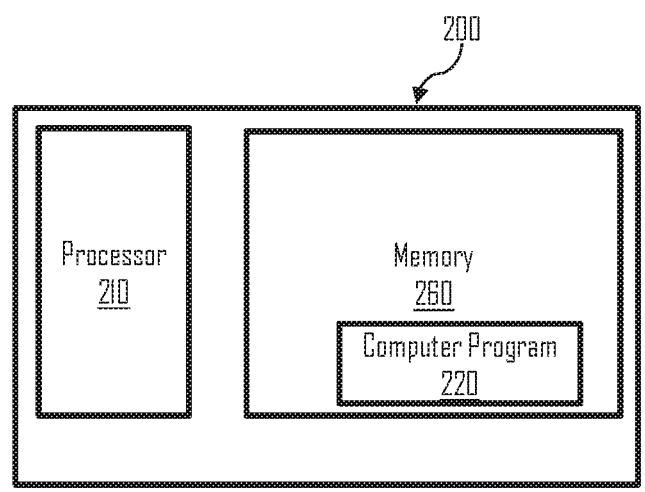
FIG. 2 shows a block diagram of an example apparatus in which examples of the disclosed embodiments may be applied.

The example of FIG. 2 shows an exemplifying apparatus.

FIG. 2 is a block diagram depicting an apparatus 200 operating in accordance with an example embodiment of the invention. The apparatus 200 may be, for example, an electronic device such as a chip, chip-set, an electronic device, a network function or an access node such as a base station. The apparatus comprises one or more control circuitry, such as at least one processor 210, and at least one memory 260, including one or more algorithms such as a computer program instructions 220 wherein the at least one memory 260 and the computer program instructions 220 are configured, with the at least one processor 210 to cause the apparatus 200 to carry out any of the example functionalities described below. In the example of FIG. 2, the apparatus 200 is comprised by a base station. According to an example embodiment, the apparatus 200 is configured to communicate with a user device. The user device may be, for example, a mobile computing device.

In the example of FIG. 2, the processor 210 is a central unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 is located in an access network such as a radio access network (RAN). A radio access network (RAN) may comprise a base station, such as an eNodeB or a gNodeB, and antennas that cover a given geographical region.

According to an example embodiment, the apparatus 200 is configured to receive information relating to data consumption characteristics of at least one user device and/or related user. Information relating to data consumption characteristics may comprise a data consumption characteristic value or data based on which a data consumption characteristic value is determined.

Data consumption characteristics may comprise a data consumption pattern that comprises a combination of data consumption characteristics. For example, a data consumption pattern may comprise at least a first data consumption characteristic and a second data consumption characteristic. Data consumption characteristics may include, for example, data consumption activity, a way of consuming data, a type of consumed data and/or a context of consuming data. For example, data consumption activity may comprise information on how often a user consumes data or a classification indicating an intensity of consuming data such as a user is a non-user, medium user or heavy user. A way of consuming data may comprise information on the manner the user consumes data, whether the user streams content, watches content, downloads content, uploads content, uses various applications, and/or browses content on the internet. A type of data consumed may comprise, for example, video and/or audio. A context of consuming may comprise, for example, a location of consuming data, a date and/or a time of day. A location may comprise a geographical location, a cell in a mobile communication network, a venue, a location on the internet or an application that a user is using. A context of consuming may also comprise information on whether the user moves when consuming content, whether the user likes and/or recommends content. Different user devices may have different data consumption characteristics and/or data consumption patterns.

According to an example embodiment, data consumption characteristics comprise one or more previous locations of the at least one user device. A previous location may comprise a geographical location detected by a global positioning system (GPS) or information on one or more networks that the user device has been connected to. A network with which a user has been connected to may comprise a mobile network such as a radio access network (RAN), and the network may be indicated by, for example, a cell ID or access point name.

According to an example embodiment the data consumption characteristics comprise one or more user groups with which the at least one user device is associated. A user group may comprise one or more user devices that have a similar data consumption pattern and/or data consumption characteristics. A user group may be identified by a user group ID. A user group ID may comprise, for example, a numeric value or a label. The one or more user groups may be created by the apparatus 200, such as an optimization engine, and sent to the at least one user device for association.

There may be different user groups for different data consumption patterns. According to an example embodiment, a user device is associated with a user group based on a way of consuming content and a context of consuming content. For example, a user group may comprise user devices with which a user watches live sports streams while commuting, watches linear TV while commuting, watches live sports at home, watches linear TV at home, streams live content at a sports event, streams live content at a concert, watches live streams from social media, does not consume live content or the like.

A user device may be associated with one or more user groups based on metadata associated with a user device. Metadata associated with the user device may comprise metadata relating to using the user device and/or metadata relating to a user of the user device. For example, metadata may comprise search history, content consumption history, location history and/or personal details. Search history may be analysed based on user key words that may characterise a user's interests. Analysing search history may comprise analysing key words that relate to media content. Content consumption history may be analysed based on information on consumed linear and non-linear content. Linear content such as linear television follows a schedule, whereas non-linear content such as non-linear television comprises on-demand content that can be chosen any time. Analysing content consumption history may also comprise analysing the origin address of the content. Location history may be analysed based on user's geographical locations or based on abstract locations such as home, work, commute, gym or the like. Personal details may comprise miscellaneous personal information about the user such as home location, work location, media service subscriptions, installed applications or the like. Location history may comprise one or more previous locations of the user device. Location history may comprise, for example, one or more geographical locations of the user device, cell association history or access point association history of the user device.

According to an example embodiment, the apparatus 200 is configured to define one or more user groups. The apparatus 200 may be configured to define the one or more user groups by clustering data consumption patterns received from a plurality of user devices. The apparatus 200 may be configured to cluster the data consumption patterns based on one or more criteria. The data consumption patterns may be collected, for example, from multiple users that are willing to participate in the development of the solution. Additionally or alternatively, the user group configuration information may be defined based on content delivery data, such as type of the content and related one or more transmission events scheduled to occur at specific time points.

A user device may be associated with a user group by the user device itself or by the apparatus 200.

According to an example embodiment, the apparatus 200 is configured to associate the at least one user device and/or related user with one or more user groups based on the received information. For example, the apparatus 200 may be configured to associate a first user device with two different user groups such as a group comprising users that watch live sports while commuting and a group comprising users that stream live content at a sports event. The apparatus may also be configured to associate a second user device with one group such as a group comprising users not consuming live content.

According to an example embodiment, the apparatus 200 is configured to send configuration information to a user device. The configuration information may comprise at least one criterion for associating the user device with a defined user group. According to an example embodiment, the apparatus 200 is configured to send user group configuration information to the at least one user device. The user group configuration information may comprise a user group configuration algorithm for associating a user device with one or more user groups defined by the apparatus 200. The user group configuration algorithm may be determined by the apparatus 200, for example, based on clustering data consumption patterns of different users. Additionally or alternatively, the user group configuration information may be defined based on content delivery data, such as type of the content and related one or more transmission events scheduled to occur at specific time points. The apparatus 200 may be configured to send updated user group configuration information, if, for example, the observed long-term user behaviour changes.

According to an example embodiment, the apparatus 200 is configured to receive information on one or more transmission events scheduled to occur at a first point in time. Information on a transmission event may comprise, for example, information on content, a type of content, content schedule or the like. A type of content may comprise, for example, sports, reality shows, series or the like. A content schedule may comprise a point in time when content is scheduled to be provided or a time interval during which content is scheduled to be provided.

A transmission event may comprise transmitting content at a particular point in time. A transmission event may comprise an upcoming transmission event. The apparatus 200 may be configured to receive the information on one or more transmission events from, for example, an electronic service guide (ESG). According to an example embodiment, the first point in time comprises a future point in time.

According to an example embodiment, the apparatus 200 is configured to determine user group configuration information based on received information on one or more transmission events. The one or more transmission events may comprise, for example, periodic events such as football world cup, formula one races or winter/summer Olympics. The user group configuration may also depend on geographic areas.

According to an example embodiment, the apparatus 200 is configured to predict, based on the received information, at least one data consumption area at a first point in time. The first point in time may comprise a point in time in which a one or more data transmission events are scheduled to occur.

The apparatus 200 may be configured to execute a prediction algorithm for predicting the at least one data consumption area. The apparatus 200 may be configured to predict at least one data consumption area, for example, by analysing user data and comparing the analysed data with known content consumption behaviour, for example, in terms of the time and location in which the content is consumed. Based on the comparison, the apparatus 200 may be configured to determine similarity with the known consumption behaviour and predict, based on the similarity, a probability of a user consuming particular content. A data consumption area may comprise a geographical area or an area covered by one or more access networks. An access network may comprise a radio access network or fixed network. For example, the apparatus 200 may be configured to estimate the cells where data is consumed at a first point in time.

The apparatus 200 may be configured to classify a data consumption area into different types of areas. According to an example embodiment a data consumption area may comprise a multi-cell multicast transmission area, a single-cell multicast transmission area, a unicast transmission area, a fixed network area or no content consumption area.

The apparatus 200 may be configured to classify a data consumption area as a multi-cell multicast transmission area in response to predicting that common content is consumed simultaneously by users in a large and contiguous area. In a multi-cell multicast transmission area multiple cells may be configured to transmit data in a synchronous manner.

The apparatus 200 may be configured to classify a data consumption area as a single-cell multicast transmission area in response to predicting that common content is consumed simultaneously by users in a finite, physically sparse area. In a single-cell multicast transmission area data is transmitted by physically confined single cells.

The apparatus 200 may be configured to classify a data consumption area as a unicast transmission area in response to predicting that common content delivery is probably not needed.

The apparatus 200 may be configured to classify a data consumption area as a fixed network area in response to determining that data is to be consumed by users connected to fixed networks.

According to an example embodiment, the apparatus 200 is configured to predict the at least one data consumption area based on the data consumption characteristics. According to an example embodiment, the apparatus 200 is configured to predict the at least one data consumption area based on one or more user groups with which the user device is associated. For example, the apparatus 200 may receive information that a user device is associated with a user group that watches live sports streams at home and the area where the user's home is located may be considered as a data consumption area.

According to an example embodiment, the apparatus 200 is configured to combine a plurality of predictions of the at least one data consumption area at a second point in time. A second point in time may comprise a future point in time. The second point in time may occur after the first point in time. Combining multiple predictions enables setting up transmission services in advance.

Without limiting the scope of the claims, an advantage of predicting at least one data consumption area is that access network may be setup to operate more efficiently in different situations.

According to an example embodiment, the apparatus 200 is configured to determine one or more data transmission modes based on the received information and the predicted at least one data consumption area. According to an example embodiment, a transmission mode comprises at least one of multicast transmission, unicast transmission, anycast transmission or broadcast transmission.

According to an example embodiment, the apparatus 200 is configured to instruct at least one communication network element to provide data transmission at the first point in time according to the determined data transmission mode. The apparatus 200 may be configured to instruct at least one communication network element during setup of data transmission session. A network element may comprise a base station such as a fourth generation/Long Term Evolution (LTE) eNodeB or a fifth generation base station/gNodeB or an access point. Instructing at least one communication network element may comprise configuring appropriate access network nodes for transmission according to the determined data transmission mode such as multicast, unicast, broadcast or anycast.

According to an example embodiment, the apparatus 200 is further configured to provide content and/or service using the determined data transmission mode. The content and/or service may comprise content/service scheduled to occur at the first point in time.

According to an example embodiment, the apparatus 200 is configured to determine one or more communication network elements associated with the at least one predicted data consumption area. One or more communication network elements associated with a predicted data consumption area may comprise one or more communication network elements that are physically located in the predicted data consumption area.

Without limiting the scope of the claims, an advantage of instructing at least one communication network element to provide data transmission at the first point in time according to the determined data transmission mode may be that it is possible to dynamically switch between different transmission modes. Another advantage may be that network resources may be used more efficiently, when unnecessary transmission may be avoided.

According to an example embodiment, the apparatus 200 comprises means for performing features of the apparatus 200, wherein the means for performing comprises at least one processor 210, at least one memory 260 including computer program code 220, the at least one memory 260 and the computer program code 220 configured to, with the at least one processor 210, cause the performance of the apparatus 200. The means for performing features of the apparatus 200 may comprise, for example, means for receiving information relating to data consumption characteristics of at least one user device, means for predicting, based on the received information, at least one data consumption area at a first point in time, means for determining one or more data transmission modes based on the received information and the predicted at least one data consumption area and means for instructing at least one communication network element to provide data transmission at the first point in time according to the determined data transmission mode. The means for performing may further comprise means for associating the at least one user device with one or more user groups based on the received information, means for determining one or more communication network elements associated with at least one predicted data consumption area, means for receiving information on one or more transmission events scheduled to occur at the first point in time, means for sending user group configuration information to the at least one user device, means for determining user group configuration information based on the received information on the one or more transmission events and means for combining a plurality of predictions of the at least one data consumption area at a second point in time.

Figure 3:
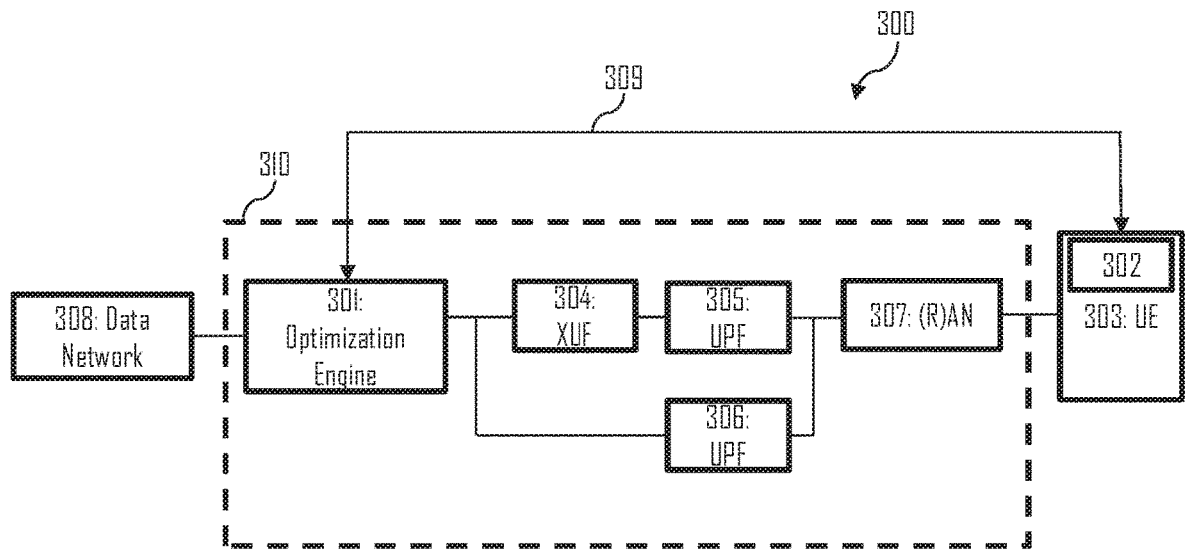
FIG. 3 shows a block diagram of an example overall architecture in which examples of disclosed embodiments may be applied.

FIG. 3 illustrates an overall architecture in which examples of disclosed embodiments may be applied. In the example of FIG. 3, an optimization engine 301 is an apparatus 200 according to the example in FIG. 2. The optimization engine 301 is configured to perform transmission optimization in a communication network 310 by determining one or more data transmission modes based on information relating to data consumption characteristics of at least one user device and predicted at least one data consumption area, and by instructing at least one network element to provide data transmission according to the one or more determined data transmission modes.

The optimization engine 301 is configured to communicate 309 with an optimization engine client 302 comprised by a UE 303. For example, the optimization engine 301 is configured to send user group configuration information, such as a user group configuration algorithm and/or already defined user group IDs, to the optimization engine client 302 and, in response to sending the user group configuration information, receive data consumption characteristics of the UE 303. The data consumption characteristics may comprise, for example, one or more user groups with which the UE 303 is associated.

The optimization engine 301 is configured to instruct at least one communication network element to provide data transmission according to the received data consumption characteristics and/or content characteristics. Instructing at least one communication network element may comprise, for example, configuring radio access network nodes for transport/transmission of Xcast data. Here the Xcast data indicates data that is intended to be delivered to a multitude of users, which can be transported over the access or backhaul network using multicast, unicast or broadcast. Different communication network elements may comprise, for example, an Xcast user plane function (XUF) 304, one or more access network user plane functions (UPF) 305, 306 and one or more (radio) access network functions ((R)AN) 307. The optimization engine 301 may also inform the data network 308 about possible transport/transmission modes.

Figure 4:
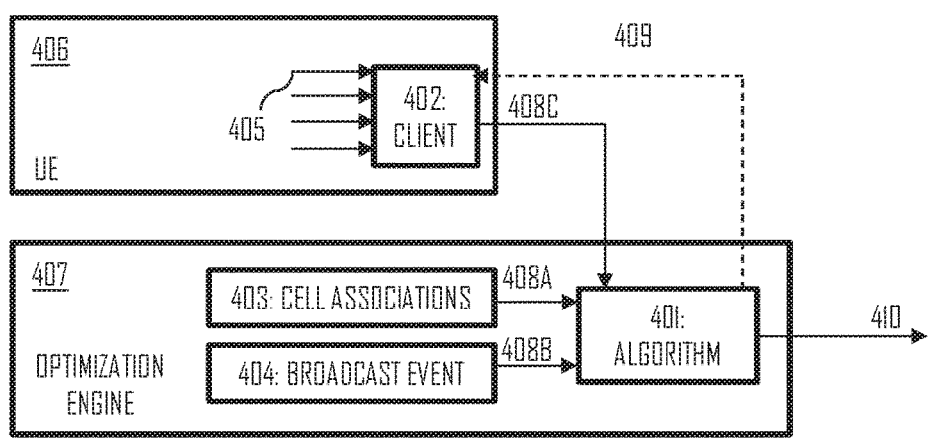
FIG. 4 shows a block diagram of an example overall architecture in which examples of disclosed embodiments may be applied.

FIG. 4 is a block diagram comprising a user device 406 and an optimization engine 407. The user device may comprise a computing device.

The user device comprises an optimization engine client 402 similar to the optimization engine client 302 in the example of FIG. 3. The user device 406 comprises one or more control circuitry, such as at least one processor, and at least one memory, including one or more algorithms such as a computer program instructions wherein the at least one memory and the computer program instructions are configured, with the at least one processor to cause the user device 406 to carry out any of the example functionalities described below.

The user device 406 is an apparatus configured to determine data consumption characteristics of a user of the apparatus. The data consumption characteristics may be determined based on metadata associated with user actions and/or user information. Suitable metadata may be selected based on configuration information 409 received from the optimization engine 407. According to an example embodiment, the data consumption characteristics comprise at least one of the following: search history, content consumption history, location history, estimated personal interest or personal details of a user of the apparatus.

According to an example embodiment, the user device 406 is an apparatus configured to associate the apparatus with at least one user group based on the data consumption characteristics. In the example of FIG. 4, the user device 406 is configured to provide the optimization engine 407 with information on one or more user groups with which the user device 406 is associated.

According to an example embodiment, the user device 406 is an apparatus configured to inform a server device about the at least one user group with which the apparatus is associated. In the example of FIG. 4, the server device comprises the optimization engine 407.

In the example of FIG. 4, the optimization engine 407 comprises an algorithm 401 for predicting 410 requested content and content schedule and at least one data consumption area. The algorithm 401 may be, for example, a machine learning algorithm executed in the optimization engine 407. A machine learning algorithm enables predictive and proactive operation based on pre-determined inputs. In the example of FIG. 4, the algorithm 401 receives as input 408A information on previous cell associations 403 of the user device 406, a 408B broadcast content and event schedule 404 and 408C at least one user group with which the user device 406 is associated. The one or more previous cell associations 403 comprise a cell association history. A cell association may comprise information on a network element that a user device has previously connected. For example, information on a cell association may comprise a cell ID. Information on a cell association may also comprise a point in time when the user device was connected to the network element. One or more previous cell associations may be used for more accurately predicting locations where data might be consumed. Broadcast content and event schedule 404 comprises information on content to be broadcast and a point in time or a time interval when it is scheduled to be broadcasted.

Figure 5:
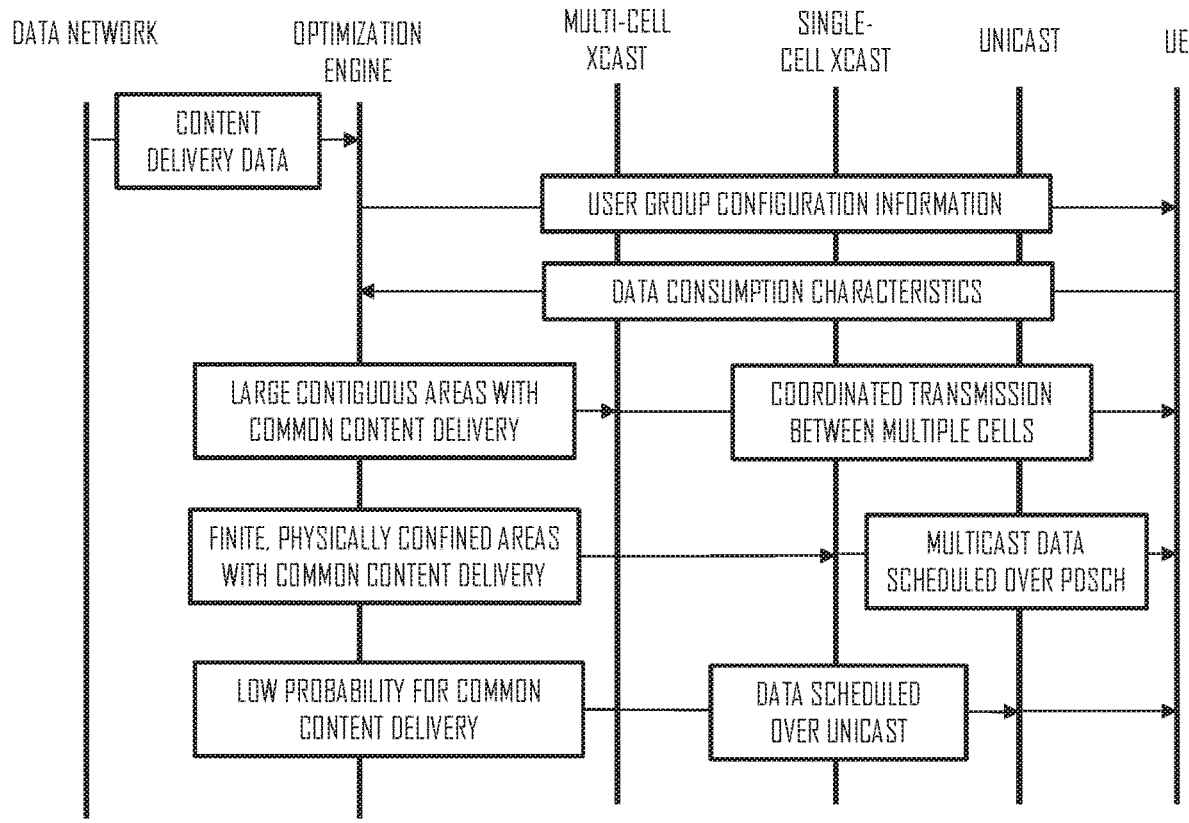
FIG. 5 illustrates an example signalling diagram incorporating aspects of the examples of the invention.

FIG. 5 illustrates an example signalling diagram depicting an example embodiment. In this embodiment, an optimization engine receives content delivery data such as a type of content and one or more transmission events scheduled to occur at pre-defined points in time. Based on the received content delivery data, the optimization engine sends user group configuration information to a user device. The user group configuration information informs the user device about the data that needs to be collected for determining at least one user group to which the user device is associated with. In response to sending the user group configuration information, the optimization engine receives data consumption characteristics from the user device. The data consumption characteristics may comprise, for example, one or more user groups with which the user device is associated and data consumption location information such as previous cell associations of the user device. Based on the received data consumption characteristics, the optimization engine predicts at least one data or content consumption area, content to be consumed and content schedule. If the optimization engine predicts that data or content will be consumed in large contiguous areas with common content delivery, at least one communication network element is instructed to provide multi-cell Xcast transmission in terms of coordinated transmission between multiple cells. If the optimization engine predicts that data will be consumed in finite, physically confined areas with common content delivery, at least one communication network element is instructed to provide single-cell Xcast transmission in terms of multicast data scheduled over physical downlink shared channel (PDSCH). If the optimization engine predicts that there is low probability for common content delivery, at least one communication network element is instructed to schedule data over unicast transmission.

Figure 6:
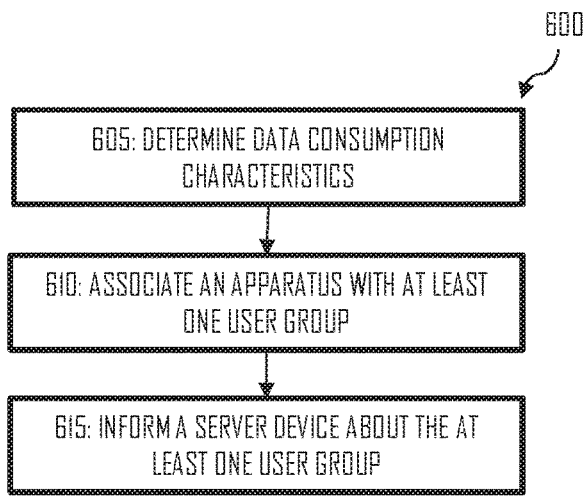
FIG. 6 illustrates an example method according to an example embodiment of the invention.

FIG. 6 illustrates a method 600 incorporating aspects of the previously disclosed embodiments. More specifically, the example method 600 illustrates informing a server device about at least one user group. The method 600 may be performed by an apparatus comprised by a user device.

The method starts with determining 605 data consumption characteristics of a user of the apparatus. The data consumption characteristics may comprise search history, content consumption history, location history, estimated personal interest and/or personal details of a user of the apparatus.

The method continues with associating 610 the apparatus with at least one user group ID defined by the optimization engine based on the data consumption characteristics and informing 615 a server device about the at least user group with which the apparatus is associated.

FIG. 7 illustrates a method 700 incorporating aspects of the previously disclosed embodiments. More specifically, the example method 700 illustrates instructing at least one communication network element to provide data transmission.

The method starts with receiving 705 information relating to data consumption characteristics of at least one user device. The data consumption characteristics may comprise one or more user groups with which the at least one user device is associated, or information based on which the user device may be associated with one or more user groups. The data consumption characteristics may further comprise one or more previous locations of the at least one user device.

The method continues with predicting 710, based on the received information, at least one data consumption area at a first point in time and determine 715 one or more data transmission modes based on the received information and the predicted at least one data consumption area. The one or more transmission mode may comprise at least one of multicast transmission, unicast transmission, anycast transmission or broadcast transmission.

The method further continues with instructing 720 at least one communication network element to provide data transmission at the first point in time according to the determined data transmission mode.

FIG. 8 illustrates a method 800 incorporating aspects of the previously disclosed embodiments. More specifically, the example method 800 illustrates associating an apparatus with one or more user groups. In this example, the apparatus is a user device.

The method starts with determining 805 data consumption characteristics of a user of the apparatus. Data consumption characteristics may comprise a data consumption pattern that comprises a combination of data consumption characteristics. The method continues with associating 810 the apparatus with at least one user group based on the data consumption characteristics and informing 815 a server device about the at least one user group with which the apparatus is associated.

FIG. 9 illustrates a method 900 incorporating aspects of the previously disclosed embodiments. More specifically, the example method 900 illustrates predicting at least one content consumption area and requested content. The method may be performed by a prediction algorithm using machine learning.

The method starts with receiving 905 previous cell associations of a user device. A cell association may comprise information on a network element that a user device has previously connected. For example, information on a cell association may comprise a cell ID. Information on a cell association may also comprise a point in time when the user device was connected to the network element.

The method continues with receiving 910 a broadcast content and event schedule. Broadcast content and event schedule 404 comprises information on content to be broadcast and a point in time or a time interval when it is scheduled to be broadcasted.

The method further continues with receiving 915 information relating to data consumption characteristics. In the example of FIG. 9, the data consumption characteristics comprise one or more user group IDs provided by a user device.

The method further continues with predicting 920 at least one content consumption area and requested content. Requested content may comprise information on the content and content schedule. The content consumption area may comprise one or more network elements. Based on the predicted content consumption area and the requested content, one or more communication network elements may be instructed to provide a particular type of data transmission.

Without limiting the scope of the claims, an advantage of predicting at least one data consumption area and instructing at least one communication network element to provide data transmission according to a determined data transmission mode is that radio resources may be used more efficiently. Another advantage may be enhanced coordination between content providers and network operators, which enables transmitting popular content efficiently.

Without in any way limiting the scope, interpretation, or application of the claims appearing below, a technical effect of one or more of the example embodiments disclosed herein is that transmission sessions may be provided dynamically such that radio resources may be optimized.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising at least one processor and at least one memory including computer program code, the at least one memory and the computer program code configured to with the at least one processor, cause the apparatus at least to:
receive information relating to data consumption characteristics of a plurality of user devices, wherein the data consumption characteristics include user device location data, content type data, and content schedule data;
predict, based on the received information, at least one data consumption area at a first point in time of at least a subset of the plurality of user devices;
determine one of a plurality of data transmission modes based on the received information and the predicted at least one data consumption area, wherein the data transmission modes include multicast transmission, unicast transmission, anycast transmission, and broadcast transmission; and
instruct at least one communication network element to provide data transmission at the first point in time to the subset of user devices according to the determined data transmission mode.

2. The apparatus according to claim 1, wherein the data consumption characteristics comprise one or more user groups with which the plurality of user devices are associated, and the content type data includes content types of sports, reality show, series, or a combination thereof.

3. The apparatus according to claim 1, wherein the apparatus is further configured to associate the plurality of user devices with one or more of the user groups based on the received information.

4. The apparatus according to claim 1, wherein the data consumption characteristics comprise one or more previous locations of the plurality of user devices.

5. The apparatus according to claim 1, wherein the apparatus is configured to determine one or more communication network elements associated with the at least one predicted data consumption area.

6. The apparatus according to claim 1, wherein the apparatus is configured to receive information on one or more transmission events scheduled to occur at the first point in time.

7. The apparatus according to claim 1, wherein the apparatus is configured to:
update the subset of user devices based on user data consumption behavior change data; and
dynamically switch to a different transmission mode based on the updated subset of user devices.

8. The apparatus according to claim 1, wherein the apparatus is configured to send user group configuration information to the at least one user device, and wherein the user group configuration information includes a user group configuration algorithm, user group identifiers, or a combination thereof based on the data consumption characteristics.

9. The apparatus according to claim 6, wherein the apparatus is configured to determine user group configuration information based on the received information on the one or more transmission events.

10. The apparatus according to claim 1, wherein the apparatus is configured to combine a plurality of predictions of the at least one data consumption area at a second point in time.

11. A method comprising:
receiving information relating to data consumption characteristics of a plurality of user devices, wherein the data consumption characteristics include user device location data, content type data, and content schedule data;
predicting, based on the received information, at least one data consumption area at a first point in time of at least a subset of the plurality of user devices;
determining one of a plurality of data transmission modes based on the received information and the predicted at least one data consumption area, wherein the data transmission modes include multicast transmission, unicast transmission, anycast transmission, and broadcast transmission; and
instructing at least one communication network element to provide data transmission at the first point in time to the subset of user devices according to the determined data transmission mode.

12. The method according to claim 11, wherein the data consumption characteristics comprise one or more user groups with which the plurality of user devices are associated, and the content type data includes content types of sports, reality show, series, or a combination thereof.

13. The method according to claim 11, further comprising:
associating the plurality of user devices with one or more of the user groups based on the received information.

14. The method according to claim 11, wherein the data consumption characteristics comprise one or more previous locations of the plurality of user devices.

15. The method according to claim 11, further comprising:
determining one or more communication network elements associated with the at least one predicted data consumption area.

16. The method according to claim 11, further comprising:
receiving information on one or more transmission events scheduled to occur at the first point in time.

17. The method according to claim 11, further comprising:
updating the subset of user devices based on user data consumption behavior change data; and
dynamically switching to a different transmission mode based on the updated subset of user devices.

* * * * *